Feb. 14, 1956   J. FRASER   2,734,660
LIQUID MEASURING AND DISPENSING APPARATUS
Filed May 13, 1952   4 Sheets-Sheet 4

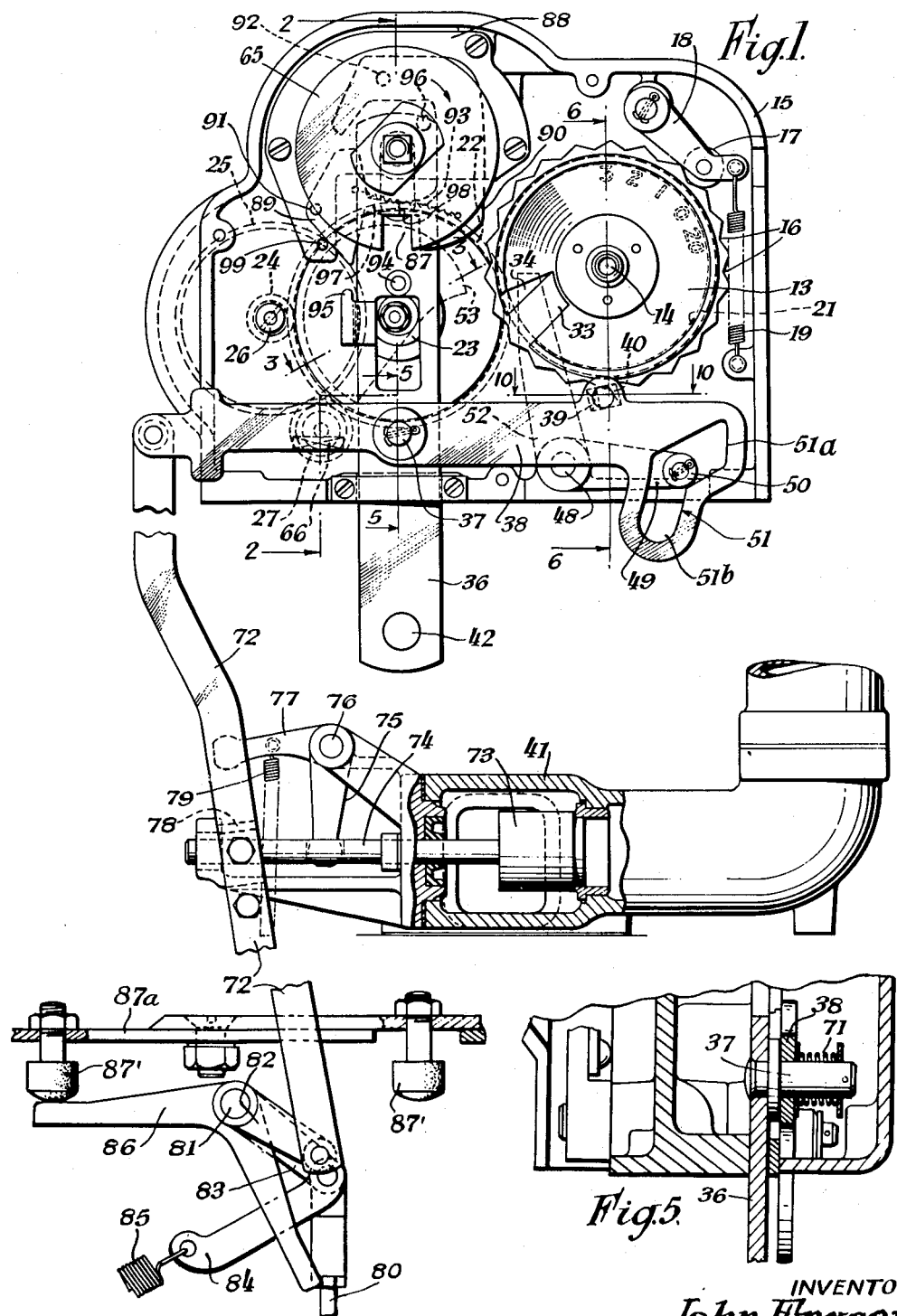

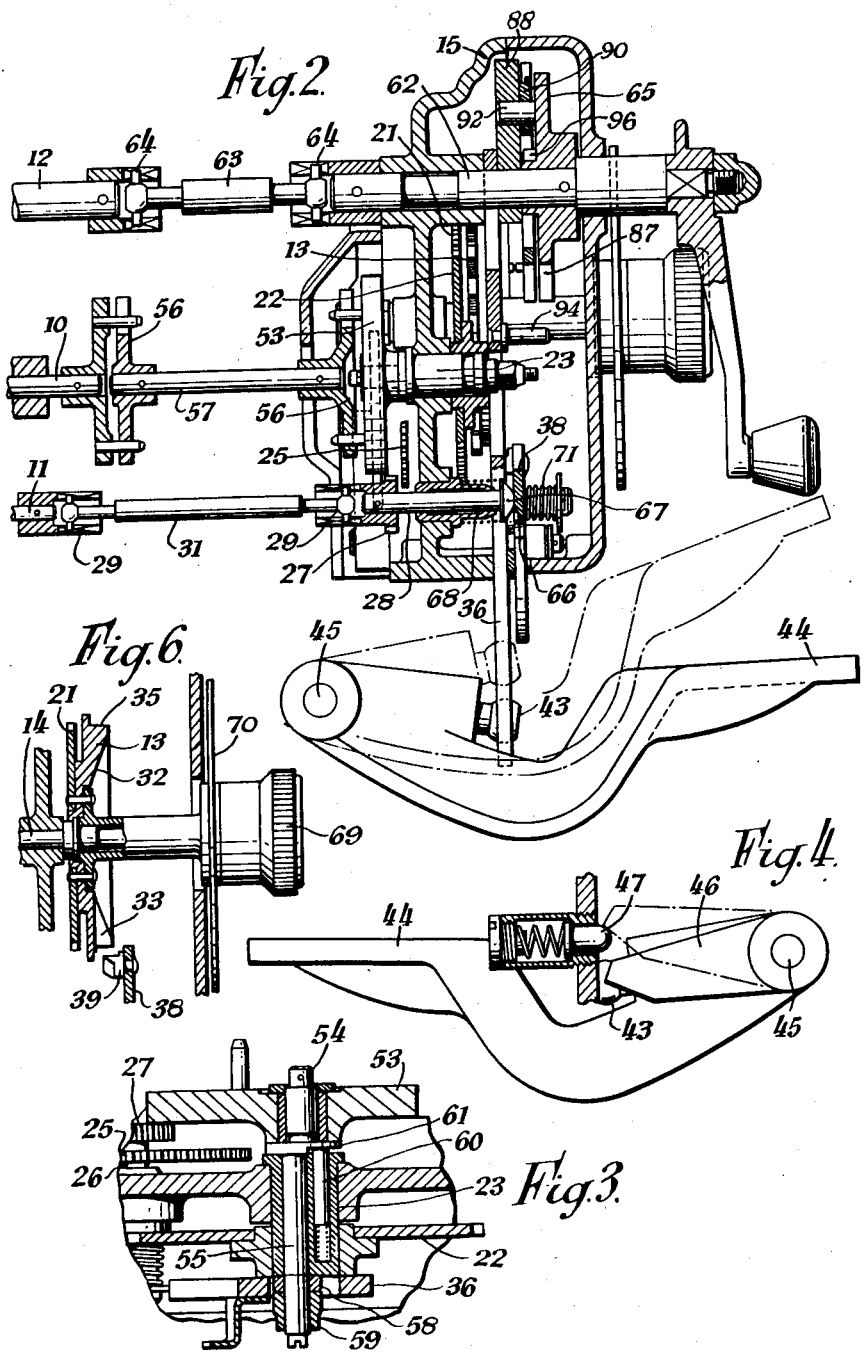

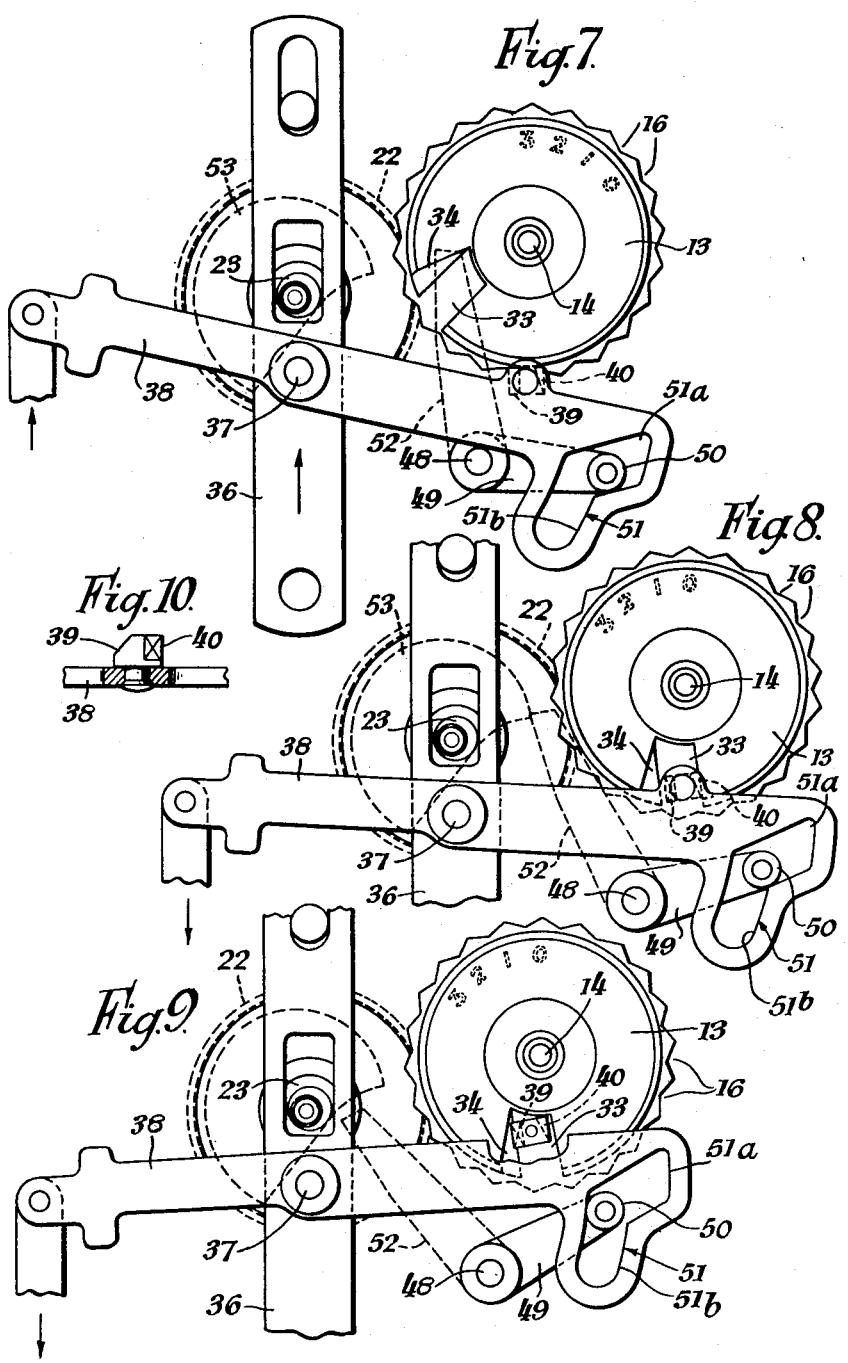

INVENTOR
John Fraser
BY

United States Patent Office 2,734,660
Patented Feb. 14, 1956

2,734,660

LIQUID MEASURING AND DISPENSING APPARATUS

John Fraser, Tolworth, Surbiton, England, assignor to Avery-Hardoll Limited, Tolworth, Surbiton, England Application May 13, 1952, Serial No. 287,660

Claims priority, application Great Britain May 24, 1951

7 Claims. (Cl. 222—15)

This invention relates to liquid measuring and dispensing apparatus, and, more specifically, to the apparatus for this purpose commonly used for dispensing petrol and other motor fuels, such apparatus being commonly known as meter pumps. The invention relates to meter pumps of the type exemplified by our prior British Patents Nos. 426,267 and 615,776, and our pending patent application No. 32,194/48, known as the "preset" type, in which, before a delivery of fuel is started, the apparatus is set to deliver the quantity required, the delivery being automatically terminated when the delivery of that quantity is completed, by the closing of a valve between the meter which measures the liquid and the nozzle through which it is delivered, the time of closing of the valve being determined by mechanism including a manually settable member adapted to be set in accordance with the quantity of fuel to be delivered, the said settable member being returned to its initial position by the operation of the meter, and, when in its initial position, permitting the closing of the cut-off valve, the cut-off valve being opened, a drive established to the settable member from the meter, and the electric motor driving the pump being switched on, by actuation of a common starting control such as a handle.

The object of the invention is to provide an improved meter pump of the preset type, in which the quantity and price of the fuel delivered are indicated in a continuous manner by drums or the like, the price indicating means being driven through adjustable gearing to enable those means to be adjusted to allow for changes in the price of the fuel.

According to the present invention the cut-off valve and the switch controlling the electric motor are controlled by a lever pivotally mounted on a member moving with the starting control, the lever carrying a projection co-operating with a disc constituting the settable member, and the arrangement being such that when the starting control is moved to the "on" position after displacement of the settable member from a zero position, the projection on the lever engages the edge of the said disc and the lever is rocked about said projection to open the cut-off valve and close the motor switch, the return of the disc to the zero position bringing a slot therein into register with the projection so that the said projection moves inwardly towards the centre of the disc and the lever rocks about its mounting on the member moving with the starting control to re-close the cut-off valve and open the motor switch.

A final cut-off mechanism is preferably provided which comes into action when the projection drops into the slot in the disc, and delays the final closure of the cut-off valve, and opening of the motor switch, until a cam driven by the meter and revolving once for each unit quantity of liquid delivered, reaches a predetermined position.

The invention is hereinafter described with reference to the accompanying drawings, in which:

Figure 1 is a front elevation of one form of apparatus according to the invention the front cover being removed and the parts being shown in the positions which they take up when the starting control is in the "off" position;

Figure 2 is a section on the line 2—2 of Figure 1 with the parts in the same position as in Figure 1;

Figure 3 is a detail section on the line 3—3 of Figure 1;

Figure 4 is a detail of a detent device for holding the starting control in the "on" position;

Figure 5 is a detail section on the line 5—5 of Figure 1;

Figure 6 is a detail section on the line 6—6 of Figure 1;

Figure 7 is a view similar to a part of Figure 1, showing the positions of the parts when the settable member has been set and the starting control moved to the "on" position;

Figure 8 is a view similar to Figure 7 showing the position of the parts immediately after the settable member has reached its zero position;

Figure 9 is another view similar to Figure 7, showing the position of the parts when a delivery has been completed;

Figure 10 is a detail section on the line 10—10 of Figure 1;

Figure 11:
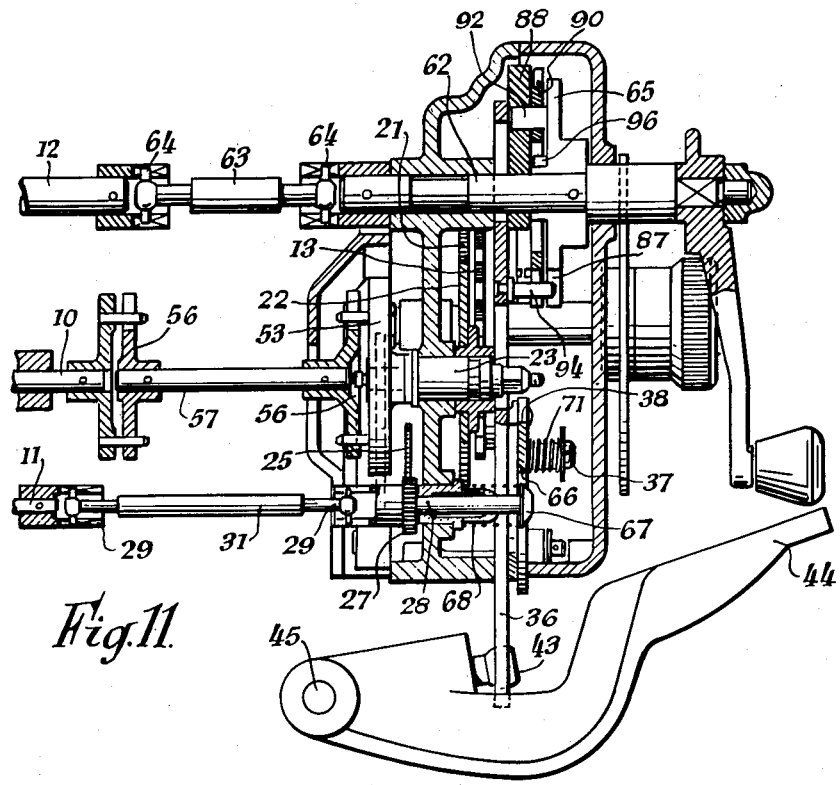
Figure 11 is a section corresponding to Figure 2, but showing the parts in the positions which they take up when the settable member has been set and the starting control moved to the "on" position.

Referring to the drawings, the apparatus shown therein is designed for use with quantity and price indicating mechanism of the type known as the Veeder-Root computer. Such mechanism includes two shafts both of which rotate once for each unit quantity of liquid delivered, the first of which, shown at 10 in Figure 2, is coupled to the visible indicators of the mechanism, whilst the second, shown at 11 in Figure 2, is coupled with a totalizer. A third shaft, shown at 12 in Figure 2, is provided for zeroising the mechanism. The first shaft 10 is operated during zeroising as well as during delivery, whilst the second shaft 11 is operated only during delivery.

The settable member of the apparatus comprises a disc 13 (Figures 1 and 6) fixedly mounted on a spindle 14 in a gear casing 15, the disc 13 having its edge notched at 16 to co-operate with a roller 17 (Figure 1) mounted on an arm 18 acted upon by a spring 19 in such a way as to urge the roller 17 against the notched edge 16 of the disc, and so locate the disc 13 in any one of a number of positions. A gear wheel 21 secured co-axially to the disc 13 meshes with a second gear wheel 22 rotatably mounted on a second spindle 23 in the gear casing 15, the second gear wheel being also in mesh with a small pinion 24 fast with a third gear wheel 25 on a third spindle 26 in the gear casing. The third gear wheel 25 is driven, when the meter is in operation, by a pinion 27 mounted on a fourth spindle 28 in the gear casing, the spindle 28 being axially movable in the said casing from the position shown in Figure 2 in which the pinion 27 is out of engagement with the gear 25, to the position shown in Figure 11 in which the pinion 27 is in mesh with the gear 25. The spindle 28 is connected, through axially slidable and universal joints 29, 29 at the ends of an intermediate shaft 31, to the second shaft 11 of the Veeder-Root computer.

The disc 13 has on one side a frusto-conical face 32 formed by increasing the thickness of the disc towards its edge, and a slot 33 is formed in the thickened portion, extending inwardly from the edge towards the centre of the disc, one side of the slot being chamfered as shown at 34 in Figures 1, 7, 8 and 9. The edge 35 of the thickened portion provides a smooth circumferential surface interrupted only by the slot 33.

A bar 36 guided for rectilinear sliding movement in the gear casing 15 has pivotally mounted thereon by means of a pin 37 fixed to the bar a lever 38 which projects on both sides of the bar and has mounted on it, towards one end, a lateral projection 39 co-operating with the smooth circumferential surface of the settable member 13. The projection 39 has an oblique face 40 on one side, as shown in Figure 10, which face co-operates with the leading edge of the mouth of the slot to provide gradual entry of the projection into the slot. The other end of the lever is connected, in a manner hereinafter described, to the cut-off valve 41 and motor switch (not shown) of the meter pump. The bar 36 is formed with a round hole 42 in which engages a spherical head 43 on a starting control handle 44 rocking about a fixed pivot at 45 and having movable with it an arm 46 (Figure 4) co-operating with a spring loaded detent 47 to retain the starting control in the "on" position.

A fifth spindle 48 mounted in the gear casing 15 has fixed to it, at one end, an arm 49 carrying a roller 50 which engages in a cam slot 51 in the end of the lever 38 adjacent the projection 39, the cam slot 51 having a straight portion 51a inclined to the length of the lever, and a curved portion 51b concentric with the pivot of the lever on the bar. The other end of the fifth spindle 48 has fixed to it another arm 52 co-operating with a cam 53 mounted to rotate on a pin 54 (Figure 3) eccentrically mounted with respect to a stem 55 passing through the second spindle 23, the cam 53 being driven, through universal joints 56, 56 at the ends of an intermediate shaft 57, from the first shaft 10 of the Veeder-Root computer. A spacing washer 58 and locknut 59 clamp the stem 55 in position in the spindle 23, the eccentric mounting providing an adjustment for the position of the cam 53. A spring loaded rod 60, acting on a flange 61 integral with the stem 55 and pin 54 provides a friction brake which restrains rotation of the flange 61 and attached parts, and thus facilitates adjustment.

A sixth spindle 62, connected by an intermediate shaft 63 and universal joints 64, 64 to the zeroising spindle 12 of the computer, passes through the gear casing, and interlocking mechanism of known type, which forms no part of this invention is provided which co-operates with this spindle 62 and the bar 36 to prevent movement of the sliding bar to start a delivery of liquid unless the computer is set to zero, and also to prevent movement of the zeroising mechanism unless the starting control is in the "off" position.

Figure 12:
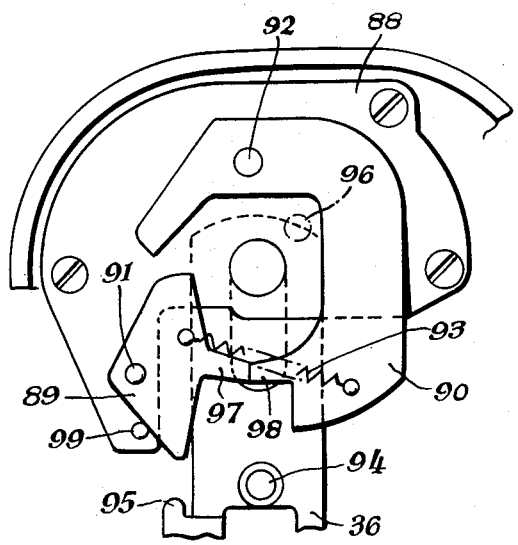
Figure 12 is an enlarged, fragmentary view of part of the interlock mechanism shown in Figure 1.

Briefly, the interlocking mechanism comprises a disc 65, Fig. 11, pinned to the shaft 62 and notched at 87, a fixed plate 88 mounted behind the disc 65, and two pawls 89 and 90 pivotally mounted at 91 and 92 respectively, Fig. 12, on the plate 88, and pawls being connected by a tension spring 93. A pin 94 carried by the bar 36 co-operates with the disc 65 and pawls 89, 90 to provide the interlocking effect. The disc 65 has been omitted in Figure 12 to show more clearly the shape and arrangement of the pawls 89 and 90. A striker 95 on the bar 36, Fig. 12, and a pin 96 on the disc 65 also cooperate with the pawls 89 and 90 as will now be described. Zeroizing of a Veeder-Root computer, as is well known in the art, is effected by rotating the zeroizing spindle through an angle of 405° the spindle being then returned by resilient means through an angle of 45°. When the computer is in the zeroized position, the notch 87 in the disc 65 is in the position shown in Figures 1 and 2, and fingers 97 and 98 on the pawls 89 and 90 are in end contact as shown in Figure 1, and, as these fingers are above the notch 87, the said notch is open. The pin 94 can therefore enter the notch 87 to allow the bar 36 to move upwardly to the "on" position, but as the bar moves towards that position the striker 95, which moves with the bar, engages a tail on the pawl 89, thus rocking the said pawl counter-clockwise so that the fingers 97 and 98 disengage, and the pawl 90 moves clockwise until the substantially radial edge thereon below the finger 98 engages the pin 94. The pin 94, being in the notch 87, prevents the computer from being zeroized. When a delivery of liquid has been completed, and the starting control 44 has been returned to its "off" position, moving the bar 36 downwardly, the disc 65 is left free to rotate for zeroizing, but the removal of the pin 94 from the notch 87 allows the pawl 90 to rock further clockwise and obturate the notch, thus preventing the starting control from being again moved to the "on" position. During the last 45° of the zeroizing movement, however, the pin 96, which rotates with the disc 65, moves the pawl 90 counter-clockwise, the spring 93 at the same time urging the pawl 89 clockwise against a stop 99, and when the disc 65 returns through the last 45° of the zeroizing movement the fingers 97 and 98 are returned to the position shown in Figure 1, leaving the notch 87 open ready for the restarting of the apparatus.

Axial movement of the fourth spindle 28, which controls the connection and disconnection of the drive to the settable member, is effected by a ramp 66 on the lever 38, Figures 2 and 11, co-operating with a chamfered head 67 on the said spindle, the spindle 28 being urged by a spring 68, acting between the head 67 and an abutment on the gear casing, to the position shown in Figure 11 in which the pinion 27 meshes with the gear wheel 25, thus making a driving connection between the totalizer spindle 11 of the computer and the settable member 13 through gears 25, 24, 22 and 21. The spindle 28 is displaced axially against the spring 68 by the ramp 66, when the lever 38 is in the position shown in Figure 2, to disconnect the drive.

The disc 13 is connected as shown in Figure 6, with a knob 69 and a dial 70 marked in unit quantities of liquid, the dial co-operating with an indicating mark on the casing to show the setting of the settable member.

The lever 38 is located in the direction perpendicular to its normal plane of movement only by a spring 71, Figure 5, on the pivot pin 37, and can therefore move in that direction if urged to do so by a force strong enough to overcome that spring. The chamfered edge 34 of the slot 33 in the disc 13 applies such a force to the lever 38 through the projection 39 if, for any reason, the disc 13 continues to turn after the projection has entered the slot, and the projection 39 can therefore ride out of the slot, thus avoiding jamming of, and consequent damage to, the apparatus. The shaping of the projection 39 to provide gradual entry into the slot 33, avoids a sharp impact of the arm 52 on the cam 53, thus producing a gradual movement of the cut-off valve towards the closed position. The spring 71 is strong enough to resist displacement of the lever 38 by the spring 68.

The lever 38 is connected to the cut-off valve 41 and motor switch (not shown) by linkage means comprising a main control rod 72 (Figure 1) the valve 41 having a closure member 73 mounted on a rod 74 slotted to receive one end of an arm 75 fast on a spindle 76 to which is also fixed a second arm 77 co-operating with an abutment 78 on the rod 72 so that upward movement of the rod 72 opens the valve. The valve is closed by a light spring 79 acting on the arm 77. The motor switch is operated by a further rod 80 connected to the main control rod 72 through a spindle 81 mounted in fixed bearings (not shown) in the casing of the apparatus and having fixed to it two arms 82 and 83, the arm 82 being pivotally connected to the main control rod 72 and the arm 83 being pivotally connected to the rod 80. The arm 83 has secured to its end which is coupled to the rod 80 a bent link 84 to which is connected a strong spring 85 urging the spindle 81 in a direction to open the switch and acting through the rod 72 and lever 38 to urge the projection 39 against the peripheral surface 35 of the settable member 13, the arrangement being such that when the switch is in the closed position the arm 83 is substantially aligned with the spring 85, so that the load exerted by the said spring on the main control rod is very small when the switch is in the closed position, but increases as the said rod moves towards the position shown in Figure 1 to open the switch. The rod 80 has a lost motion connection to the switch, so arranged that the switch is closed by initial upward movement of the main control rod, but is opened only by the final part of the downward movement when the final cut-off cam allows complete closure of the cut-off valve. As shown in Figure 1, the abutment 78 is spaced from the arm 77 when the parts are in the "off" position, so that the motor switch is closed before the valve 41 begins to open, and the valve 41 is closed before the motor switch is opened. A two-armed lever 86 fixed to the spindle 81 co-operates with two stops 87' mounted on the frame of the apparatus a part of which is shown at 87a, to limit the angular movement of the spindle.

The apparatus operates in the following manner. When the starting control handle 44 is in the "off" position, as shown in full lines in Figure 2, the lever 38 is in the position shown in Figure 1. With the lever 38 in this position, the cut-off valve 41 is closed, the motor switch is open, the projection 39 lies outside the smooth circumferential surface on the periphery of the disc 13 and the drive to the settable member is disconnected, the pinion 27 being held by the ramp 66 out of mesh with the gear wheel 25 as shown in Figure 2. Assuming that it is desired to deliver three gallons of liquid, the disc 13 is turned, by means of the knob 69, until the figure 3 on the dial 70 is in register with the index mark on the casing, thus moving the slot 33 in the disc to the position shown in Figures 1 and 7. The starting control handle 44 is then moved to the "on" position, shown in Figure 11, lifting the bar 36 and rocking the lever 38 to the position shown in Figure 7. Such movement first moves the bar 38 about its pivotal connection to the rod 72 until the projection 39 engages the smooth circumferential edge of the disc 13, and then moves the said bar about the projection 39 as a fulcrum to lift the rod 72, the lifting of the latter opening the cut-off valve 41 and closing the motor switch, the springs 79 and 85 being tensioned. This movement of the lever 38 moves the ramp 66 clear of the head 67 on the spindle 28 as shown in Figure 11, and that spindle is therefore moved axially by the spring 68 to either at once engage the pinion 27 with the gear wheel 25, or to press the said pinion against the side of the gear wheel so that they engage as soon as rotation of the pinion brings the teeth into register. The closing of the motor switch puts the pump of the meter pump into operation, and, until the hose-cock through which the liquid is delivered is opened, pumps liquid through a by-pass valve (not shown) back to the suction side of the pump. When the hose-cock is opened, liquid passes through the meter, and the resulting operation of the meter causes the disc 13 and the cam 53 to revolve, the latter making a complete revolution for each gallon of liquid delivered. During the delivery of the third gallon, the slot 33 in the disc 13 comes opposite to the projection 39 in the lever 38, and the said projection, due to the obliquity of the face 40 therein, moves gradually into the slot 33, allowing the lever 38 to turn about its pivot at 37 in the opposite direction to that in which it was turned by the displacement of the handle 44 to the "on" position, thus allowing the cut-off valve 41 to close partially, but leaving the motor switch in the "on" position. The movement of the lever 38 is limited by the engagement of the arm 52 with the cam 53, the roller 50 remaining in the straight part 51a of the cam slot 51 in the lever. This position of the parts is shown in Figure 8. The gradual closing of the cut-off valve ensures the absence of water hammer, which might be produced by abrupt closure of the valve. When the delivery of the third gallon has been completed, the cam 53 has turned to a position at which the end of the arm 52 is no longer supported, and the said arm can rock further in a counter-clockwise direction, the arm 49 moving with it to allow the roller 50 to move into the arcuate portion 51b of the cam slot 51, as shown in Figure 9. The lever 38 can then rock further, also in a counter-clockwise direction, from the position shown in Figure 9, until the end at which it is connected to the rod 72 reaches the position which it occupies when the parts are as shown in Figure 1, thus allowing the cut-off valve 41 to close fully, and the motor switch to open, thereby terminating the delivery of liquid. The bar 36 has meanwhile been held in the raised position by the starting control handle 44, which is held in the "on" position by the detent 47, and the lever 38 can now be rocked about its pivotal connection to the rod 72 to return it to the position shown in Figure 1 by moving the handle 44 to the "off" position. The computer can then be zeroised ready for another delivery of liquid.

The arm 49 on the spindle 48 is shorter than the arm 52, and this, combined with the arrangement of the spring 85 ensures that the load exerted by the arm 52 in the final cut-off cam 53 is small, thus ensuring little wear and sustained accuracy of the apparatus. The mounting of the cam 53 on the eccentric pin 54 enables the final cut-off point to be adjusted by turning the stem 55 in the spindle 23.

I claim:

1. Control means for a meter pump, comprising a fluid passage, a valve controlling said passage, operating means for actuating said valve to cut-off the flow of liquid through said passage, said cut-off operating means comprising a manually settable member, meter-operated means to drive said manually settable member, a starting control handle, a bar, means guiding said bar for rectilinear sliding movement, means connecting said bar to said starting control handle for movement of said bar by said handle, a lever pivotally mounted on said bar, linkage means connecting said lever to said valve, said settable member having a peripheral surface provided with a gap, a projection on said lever to engage said peripheral surface and resilient means urging said projection against said peripheral surface, said settable member, when turned to a position in which the gap in the peripheral surface there is out of register with the projection, obstructing movement of the projection and causing the lever to be moved about said projection by movement of the starting control handle to move the linkage means to start delivery of liquid, said settable member being movable by said meter-operated means to a position in which the projection enters the gap and allows movement of the lever about its pivot on the bar to move the linkage means to stop delivery of liquid without movement of the starting control handle.

2. Control means according to claim 1 including two spur wheels, one of which is driven by the meter of the pump while the other has a permanent driving connection with the settable member, a spring for effecting axial relative displacement of the two spur wheels to establish a drive to the settable member, a ramp on the bar, said ramp causing an axial displacement of the said one spur wheel in the opposite direction for disengagement of the drive to the settable member.

3. Control means according to claim 1, including means for moving the projection gradually into the gap in the settable element to provide gradual movement of the cut-off valve towards its closed position.

4. Control means according to claim 1 wherein the projection has an oblique surface and rides out of the gap of the settable element when said element continues to move beyond the position in which the cut-out valve normally closes, and means for mounting the bar so that the bar is capable of moving in a direction perpendicular to its normal plane of movement to allow the projection to ride out of the gap.

5. Control means according to claim 1, comprising a limit member limiting the movement of the bar in the direction for closing the valve, and a cut-off cam driven by said meter and revolving once for each unit quantity of liquid delivered, said cam providing an abutment for said limit member and releasing said limit member to allow further movement of the bar when said cam reaches a predetermined position.

6. Control means according to claim 5 wherein said limit member comprises a spindle carrying two arms one of which engages the cam while the other carries a follower engaging a cam slot in said bar, the cam slot being so shaped that so long as the cam-engaging arm is supported by the cam the follower engages an edge of the cam slot to limit the movement of the bar, but when the said arm is released the follower enters an arcuate part of the cam slot concentric with the pivot of the bar.

7. Control means according to claim 6, wherein the arm of the limit member which engages the cut-off cam is longer than the arm bearing the follower which engages the cam slot in the bar, and a spring urging the bar in valve closing direction and exerting a diminishing force on said bar as the cut-off valve approaches its open position.

References Cited in the file of this patent

UNITED STATES PATENTS

| 2,250,326 | Carroll | July 22, 1941 |
| 2,305,221 | Mangan | Dec. 15, 1942 |